US008739062B2

(12) United States Patent
Kretz (10) Patent No.: US 8,739,062 B2
(45) Date of Patent: May 27, 2014

(54) GRAPHICAL PLAYLIST

(75) Inventor: Hans M. Kretz, Lund (SE)

(73) Assignees: Sony Corporation, Tokyo (JP); Sony Mobile Communications AB, Lund (SE)

(*) Notice: Subject to any disclaimer, the term of this patent is extended or adjusted under 35 U.S.C. 154(b) by 1425 days.

(21) Appl. No.: 11/360,414

(22) Filed: Feb. 24, 2006

(65) Prior Publication Data

US 2007/0204227 A1      Aug. 30, 2007

(51) Int. Cl.
*G06F 3/048* (2013.01)

(52) U.S. Cl.
USPC .......................................... 715/794; 715/727

(58) Field of Classification Search
USPC .................................... 715/727, 794
See application file for complete search history.

(56) References Cited

U.S. PATENT DOCUMENTS

| 4,862,389 | A * | 8/1989 | Takagi | 715/794 |
|---|---|---|---|---|
| 5,546,528 | A * | 8/1996 | Johnston | 715/807 |
| 5,874,960 | A * | 2/1999 | Mairs et al. | 715/733 |
| 5,892,511 | A * | 4/1999 | Gelsinger et al. | 715/794 |
| 5,920,316 | A * | 7/1999 | Oran et al. | 715/779 |
| 6,040,833 | A * | 3/2000 | Henshaw | 715/794 |
| 6,072,488 | A * | 6/2000 | McFarland | 715/799 |
| 6,184,883 | B1 * | 2/2001 | Bates et al. | 715/794 |
| 7,113,190 | B2 * | 9/2006 | Heaton | 345/440 |
| 7,327,848 | B2 * | 2/2008 | Squibbs | 381/56 |
| 2001/0035882 | A1 * | 11/2001 | Stoakley et al. | 345/779 |
| 2002/0130904 | A1 * | 9/2002 | Becker et al. | 345/753 |
| 2003/0210270 | A1 * | 11/2003 | Clow et al. | 345/767 |
| 2004/0261039 | A1 * | 12/2004 | Pagan | 715/797 |
| 2005/0209983 | A1 * | 9/2005 | MacPherson | 707/1 |
| 2006/0041846 | A1 * | 2/2006 | Masselle et al. | 715/793 |
| 2007/0233726 | A1 * | 10/2007 | Torrens et al. | 707/102 |

FOREIGN PATENT DOCUMENTS

WO     WO 2007044389 A2 *   4/2007

OTHER PUBLICATIONS

Fabian Morchen et al., "MusicMiner: Visualizing timbre distances of music as topographical maps," Data Bionics Research Group, Philipps-University Marburg, May 18, 2005, http://ismir2005.ismir.net/documents/Baumann-ISMIR05Tutorial.pdf.*
Visualization for Music IR; Tutorial II, part 2 ; ISMIR2005 London UK by Stephan Baumann http://web.archive.org/web/200601021 http://web.archive.org/web/20051224170816/.*
Marc Torrens et al., "Visualizing and Exploring Personal Music Libraries," Universitat Pompeu Fabra, 2004, XP002410590, http://labs.mystrands.com/papers/visualization/ISMIR-short.pdf.*
Fabian Morchen et al., "MusicMiner: Visualizing timbre distances of music as topographical maps," Data Bionics Research Group, Philipps-University Marburg, May 18, 2005,http://ismir2005.ismir.net/documents/Baumann-ISMIR05Tutorial.pdf.*

(Continued)

*Primary Examiner* — Linh K Pham
(74) *Attorney, Agent, or Firm* — Snyder, Clark, Lesch & Chung, LLP (57) ABSTRACT

A method may include playing a number of media files and outputting a graph illustrating at least two pieces of information associated with each of the media files. A first axis of the graph may be associated with a first piece of information and a second axis of the graph may be associated with a second piece of information.

25 Claims, 6 Drawing Sheets

(56) References Cited

OTHER PUBLICATIONS

Visualization for Music IR; Tutorial II, part 2 ; ISMIR2005 London UK by Stephan Baumann; http://web.archive.org/web/200601021 http://web.archive.org/web/20051224170816/.*

Jiajun Zhu et al., "Perceptual Visualization of a Music Collection," © 2005 IEEE; http://ieeexplore.ieee.org/stamp/stamp.jsp?arnumber=01521607.*

Klaus Hinum, Human centred Design for Graphical User Interfaces Practical Guidelines, Feb. 2004, pp. 101-144 http://publik.tuwien.ac.at/files/pub-inf_2609.pdf.*

PCT International Search Report and Written Opinion, Dec. 21, 2006.

M. Torrens et al., "Visualizing and Exploring Personal Music Libraries", Universitat Pompeu Fabra, 2004, XP002410590, 8 pages.

R. Amant et al., "A Visual Interface to a Music Database", North Carolina State University, 2002, XP002410591, 4 pages.

Wikipedia: "ITunes", Internet Citation, May 10, 2005, pp. 1-6.

O. Hilliges et al., "AudioRadar: A Metaphorical Visualization for the Navigation of Large Music Collections", University of Munich, Jul. 2006, XP002410919, 12 pages.

Neumayer et al., "PlaySOM and PocketSOMPlayer, Alternative Interfaces to Large Music Collections", Proceedings Annual International Symposium on Music Information Retrieval, Sep. 11, 2005, pp. 618-623, XP002360090, pp. 618-623.

* cited by examiner

GRAPHICAL PLAYLIST

TECHNICAL FIELD OF THE INVENTION

The invention relates generally to providing information and, more particularly, to providing information for display.

DESCRIPTION OF RELATED ART

Devices that play media content, such as music and/or video content, are becoming increasingly common in every day life. For example, media players are often used at home, at work and during travel. These devices have therefore become increasingly important to users.

SUMMARY

According to one aspect, a method may include playing a plurality of songs. The method may also include outputting a graph illustrating at least two pieces of information associated with each of the plurality of songs, where a first axis of the graph is associated with a first piece of information and a second axis of the graph is associated with a second piece of information.

Additionally, the first piece of information may comprise a year in which a song was recorded and the second piece of information may comprise a genre of music associated with a song.

Additionally, the method may include receiving input from a user identifying a portion of the plurality of songs represented in the graph and outputting titles of the identified portion of the plurality of songs.

Additionally, the input received from the user may comprise graphical input enclosing a number of points illustrated in the graph.

Additionally, the input received from the user may comprise input highlighting a number of points illustrated in the graph.

Additionally, the method may comprise identifying, for each of the plurality of songs, at least two of a year in which the song was recorded, a genre associated with the song, an artist associated with the song or a rating associated with the song and storing the identified information for each of the plurality of songs.

Additionally, the method may comprise generating the graph based on the identified information.

Additionally, the method may comprise displaying abbreviated titles for each of the plurality of songs in the graph.

Additionally, the method may comprise receiving input from a user identifying a portion of the plurality of songs represented in the graph, automatically identifying additional songs based on the identified portion of the plurality of songs and at least one of displaying a title or playing one of the additional songs.

Additionally, the graph may represent songs played over a first period of time by a first device. The method may also comprise superimposing a second graph over the graph, the second graph representing songs played over a second period of time by the first device or songs played by a second device.

According to another aspect, a device that includes logic and a display is provided. The logic is configured to play a plurality of songs. The display is configured to display a graph illustrating information associated with each of the plurality of songs, where a first axis of the graph is associated with a first item of information and a second axis of the graph is associated with a second item of information.

Additionally, the first and second items of information may each comprise at least one of a year, a genre of music, an artist or a rating.

Additionally, the device may comprise an input device configured to receive input from a user identifying at least a portion of the plurality of songs represented in the graph, wherein the display is further configured to display titles of the identified portion of the plurality of songs.

Additionally, the input from the user may comprise graphical input enclosing a number of points illustrated in the graph.

Additionally, the input received from the user may comprise input highlighting a number of points illustrated in the graph.

Additionally, the device may comprise a transmitter configured to transmit the graph to a second device and a receiver configured to receive a second graph from the second device.

Additionally, the device may comprise a memory and the logic may be configured to identify, for each of the plurality of songs, at least two of a year in which the song was recorded, a genre associated with the song, an artist associated with the song or a rating associated with the song. The logic may also be configured to store the identified information for each of the plurality of songs in the memory.

Additionally, the logic may be configured to generate the graph based on the identified information for each of the plurality of songs.

Additionally, the device may comprise an input device configured to receive input from a user identifying at least a portion of the plurality of songs represented in the graph. The logic may also be configured to identify additional songs based on the identified portion of the plurality of songs.

Additionally, the logic may be configured to play one of the additional songs.

Additionally, the logic may be configured to provide a link to a music vendor on the display.

According to a further aspect, a computer-readable medium having stored thereon a plurality of sequences of instructions is provided. The instructions, when executed by at least one processor, cause the processor to play a plurality of songs and generate a graph illustrating information associated with each of the plurality of songs. A first axis of the graph may be associated with a first item of information and a second axis of the graph may be associated with a second item of information. The instructions also cause the processor to output the graph to a display.

Additionally, the first and second items of information may each comprise at least one of a year in which a song was recorded, a genre of music, an artist or a rating.

Additionally, the instructions may cause the processor to receive graphical input from a user that at least one of encloses a number of points illustrated in the graph or highlights a number of points illustrated in the graph.

According to still another aspect, a device may include means for playing a plurality of files and means for generating a graph illustrating information associated with each of the plurality of files. A first axis of the graph may be associated with a first item of information and a second axis of the graph may be associated with a second item of information. The device may also include means for outputting the graph to a display.

Additionally, the plurality of files may comprise at least one of music files, video files or video games.

According to yet another aspect, a method for generating a playlist comprises displaying a plurality of media files as data points on a multi-dimensional graph. The method also includes selecting at least some of the data points to obtain the playlist.

Additionally, the multi-dimensional graph may comprise at least one of a three dimensional graph or a four dimensional graph.

Other features and advantages of the invention will become readily apparent to those skilled in this art from the following detailed description. The embodiments shown and described provide illustration of the best mode contemplated for carrying out the invention. The invention is capable of modifications in various obvious respects, all without departing from the invention. Accordingly, the drawings are to be regarded as illustrative in nature, and not as restrictive.

BRIEF DESCRIPTION OF THE DRAWINGS

Reference is made to the attached drawings, wherein elements having the same reference number designation may represent like elements throughout.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Figure 1:
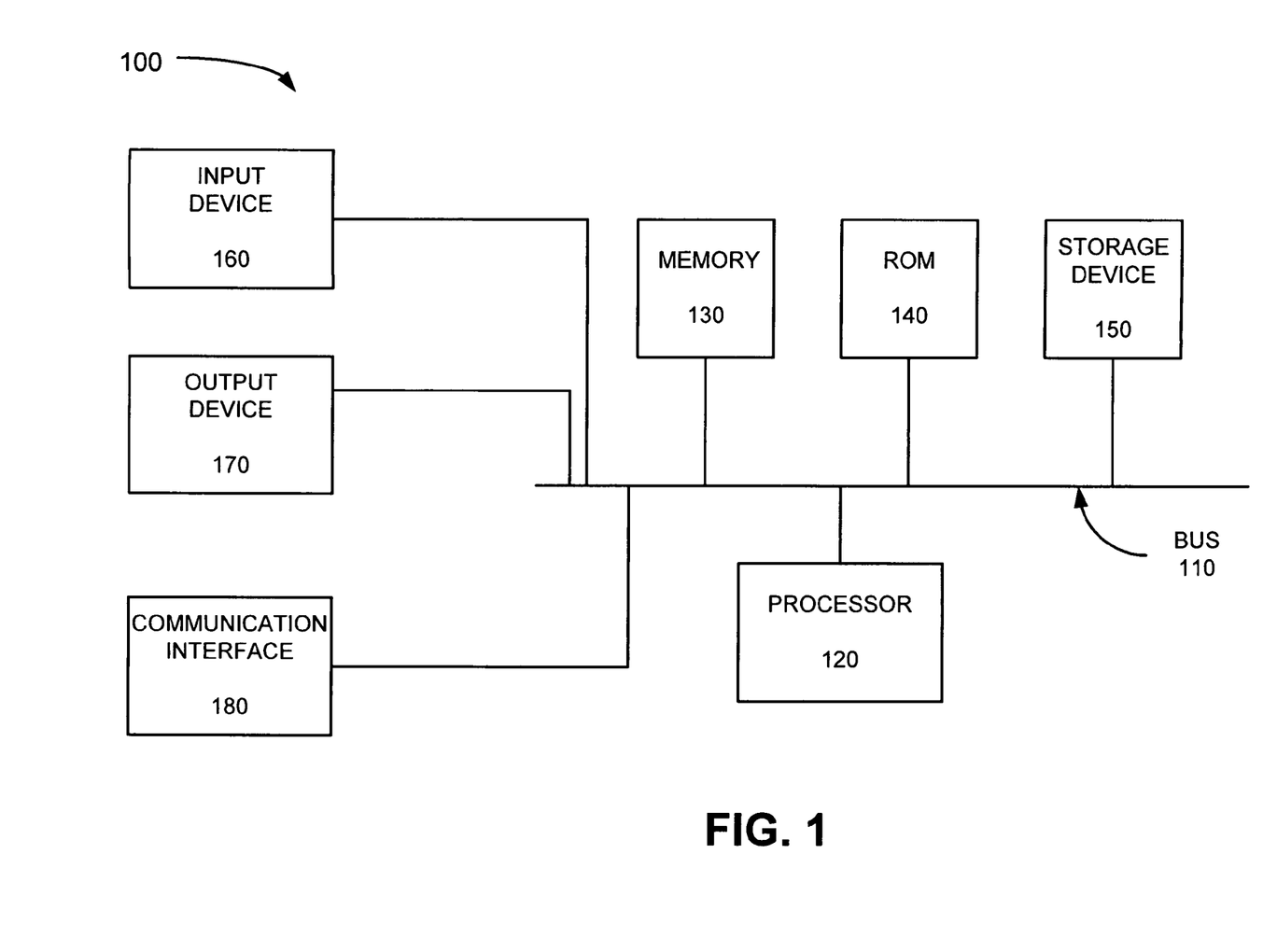
FIG. 1 is a diagram of an exemplary system in which methods and systems consistent with the invention may be implemented.

FIG. 1 is a diagram of an exemplary system 100 in which methods and systems consistent with the invention may be implemented. System 100 may include bus 110, processor 120, a memory 130, a read only memory (ROM) 140, a storage device 150, an input device 160, an output device 170, and a communication interface 180. Bus 110 permits communication among the components of system 100. System 100 may also include one or more power supplies (not shown). One skilled in the art would recognize that system 100 may be configured in a number of other ways and may include other or different elements.

Processor 120 may include any type of processor or microprocessor that interprets and executes instructions. Processor 120 may also include logic that is able to decode media files, such as audio files, video files, etc., and generate output to, for example, a speaker, a display, etc. Memory 130 may include a random access memory (RAM) or another dynamic storage device that stores information and instructions for execution by processor 120. Memory 130 may also be used to store temporary variables or other intermediate information during execution of instructions by processor 120.

ROM 140 may include a conventional ROM device and/or another static storage device that stores static information and instructions for processor 120. Storage device 150 may include a magnetic disk or optical disk and its corresponding drive and/or some other type of magnetic or optical recording medium and its corresponding drive for storing information and instructions. Storage device 150 may also include a flash memory (e.g., an electrically erasable programmable read only memory (EEPROM)) device for storing information and instructions.

Input device 160 may include one or more conventional mechanisms that permit a user to input information to system 100, such as a keyboard, a mouse, a pen, voice recognition and/or biometric mechanisms, etc. Output device 170 may include one or more conventional mechanisms that output information to the user, including a display, a printer, one or more speakers, etc. Communication interface 180 may include any transceiver-like mechanism that enables system 100 to communicate with other devices and/or systems. For example, communication interface 180 may include a modem or an Ethernet interface to a LAN. Alternatively, communication interface 180 may include other mechanisms for communicating via a network, such as a wireless network. For example, communication interface may include a radio frequency (RF) transmitter and receiver.

System 100, consistent with the invention, provides a platform through which a user may play various media, such as music files, video data, etc. System 100 may also display information associated with the media played by system 100 in a graph type format, as described in detail below. According to an exemplary implementation, system 100 may perform various processes in response to processor 120 executing sequences of instructions contained in memory 130. Such instructions may be read into memory 130 from another computer-readable medium, such as storage device 150, or from a separate device via communication interface 180. It should be understood that a computer-readable medium may include one or more memory devices or carrier waves. Execution of the sequences of instructions contained in memory 130 causes processor 120 to perform the acts that will be described hereafter. In alternative embodiments, hard-wired circuitry may be used in place of or in combination with software instructions to implement the present invention. Thus, the invention is not limited to any specific combination of hardware circuitry and software.

Figure 2:
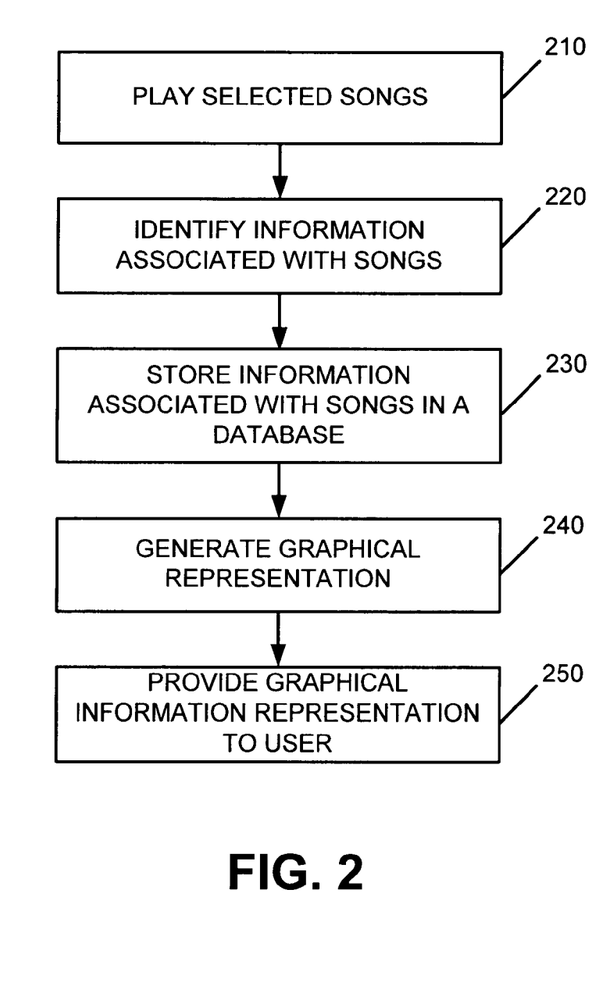
FIG. 2 is a flow diagram illustrating exemplary processing by the system of FIG. 1 consistent with the invention.

FIG. 2 is a flow diagram illustrating exemplary processing by system 100 consistent with the invention. Processing may begin when system 100 powers up. Assume that the user of system 100 begins playing various songs (e.g., music files, such as MPEG audio layer 3 (MP3) files, wav files, etc.) via system 100 (act 210). For example, the user of system 100 may select music files stored on storage device 150 via input device 160. Processor 120 may retrieve the selected music files and play them via system 100.

After playing each selected song, processor 120 may identify information associated with each song that has been played (act 220). For example, in one implementation, processor 120 may identify the year that each song was recorded and a genre associated with each song. The genre categories may include, for example, rock, pop, jazz, etc.

In one implementation, processor 120 may categorize the songs based on information included in the stored music files. For example, the stored music file for a song may include tag data or meta data that includes information about the particular song, such as the artist/performer, the title, the year the song was recorded, the genre of the song, the length of the song, etc. Processor 120, consistent with the invention, may identify the year the song was recorded and the genre of the song using this tag/meta data. Processor 120 may then stored the identified information in a database along with the title of the song (act 230).

Figure 3:
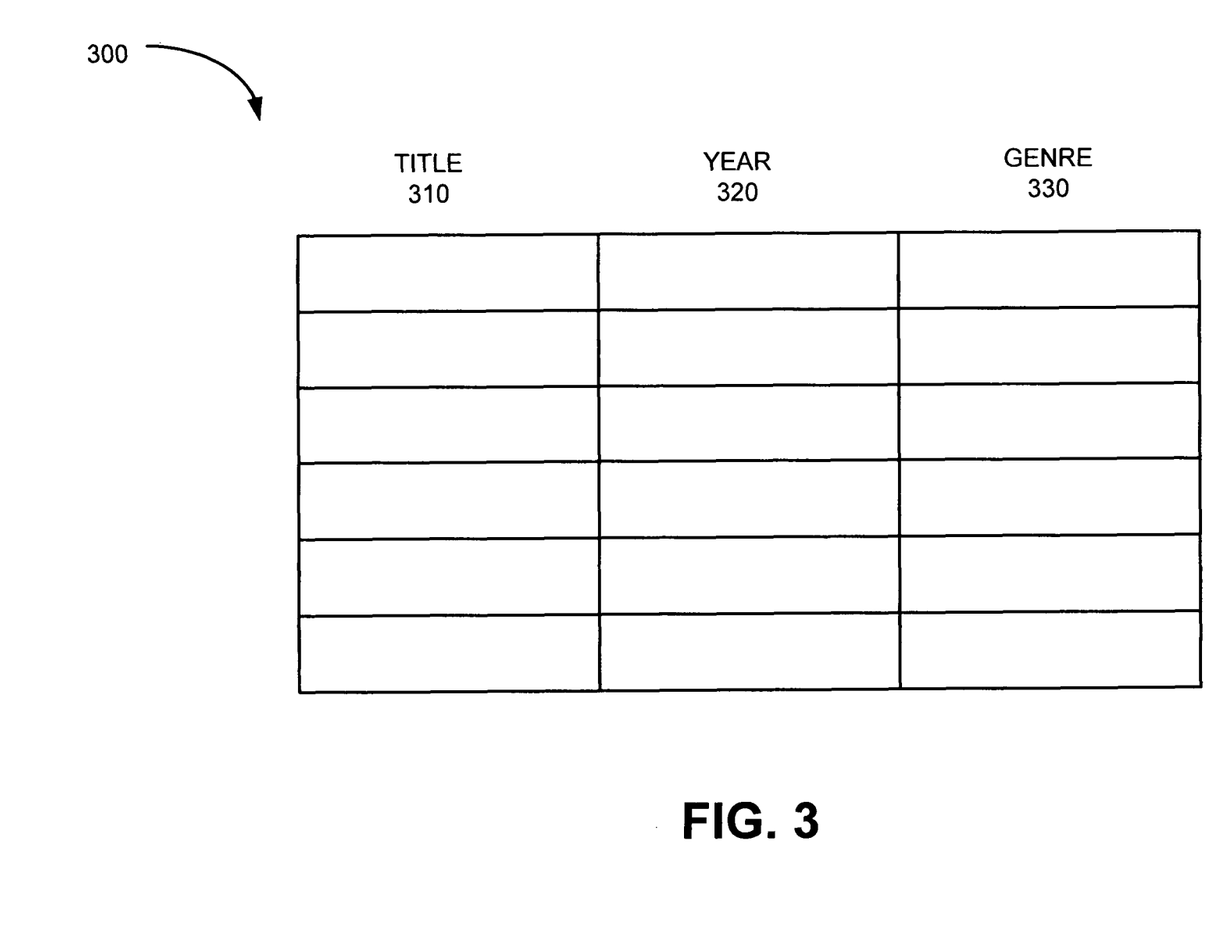
FIG. 3 is a block diagram illustrating a table stored in the system of FIG. 1 according to an exemplary implementation.

For example, FIG. 3 illustrates an exemplary database for storing information associated with songs played by system 100. Referring to FIG. 3, database 300 may include a title field 310, a year field 320 and a genre field 330. It should be understood that database 300 may include additional fields, such as an artist field, duration of song field or other fields associated with the song. Database 300 may be stored in memory 130, memory 140, storage device 150 or in another memory accessible to system 100. As system 100 plays songs, processor 120 identifies the year and genre of each song and stores the information in year field 320 and genre field 330 along with the title of the song in title field 310.

Processor 120, consistent with the invention, may also generate a graphical mapping associated with the information stored in database 300 (act 240). For example, referring to FIG. 4, in one implementation, processor 120 may create a graph 400 with the year being displayed on the x axis and the genre being displayed on the y axis. Processor 120 may then create a data point for each song stored in database 300 on graph 400. The location for a data point on the x axis may be based on the particular year stored in year field 320. The location for the data point on the y axis may be based on the information stored in genre field 330. For example, suppose an entry for a first song stored in database 300 includes the year 1970 in year field 320 and rock in genre field 330. In this case, processor 120 may identify the year 1970 on the x axis and the location for "rock" on the y axis and graph the data point, as indicated by the data point for song 1 in FIG. 4. The labels shown in FIG. 4 (i.e., labels for song 1, song 2, etc.) are shown for explanatory purposes only. However, in some implementations, the titles of the songs or abbreviated versions of the titles may be displayed on graph 400 next to the appropriate data points.

Suppose that an entry for another song in database 300 (e.g., song 2) includes the year 1971 in year field 320 and rock/pop in genre field 330. In this case, processor 120 may identify the year 1971 on the x axis and the location for rock/pop on the y axis and graph the data point as indicated at the point for song 2 in FIG. 4. In this case, the location for rock/pop may be located closer to the rock identifier on the y-axis than the pop identifier. For another song in which the genre field 330 identifies pop/rock, the location for pop/rock may be located closer to the pop identifier on the y axis than the rock identifier. Additional identifiers may be included on the y axis corresponding to any number of genres and/or subclasses of genres. For example, in one implementation, sub-identifiers, such as hard rock, soft rock, classic rock, etc. may be displayed on the y axis. This may give the user more information when viewing graph 400. In this implementation, each of the data points on graph 400 may be illustrated in a discrete manner to correspond to an identifier on the y axis. That is, each data point on graph 400 will be aligned with an identifier on the y axis. In each case, processor 120 may graph a data point for each song stored in database 300. The information stored in database 300 may be cleared after a predetermined amount of time. For example, database 300 may store songs played by system 100 over a single day, over a predetermined number of hours, etc. In this manner, the data included in graph 400 represents a "graphical playlist" of recently played songs.

Figure 4:
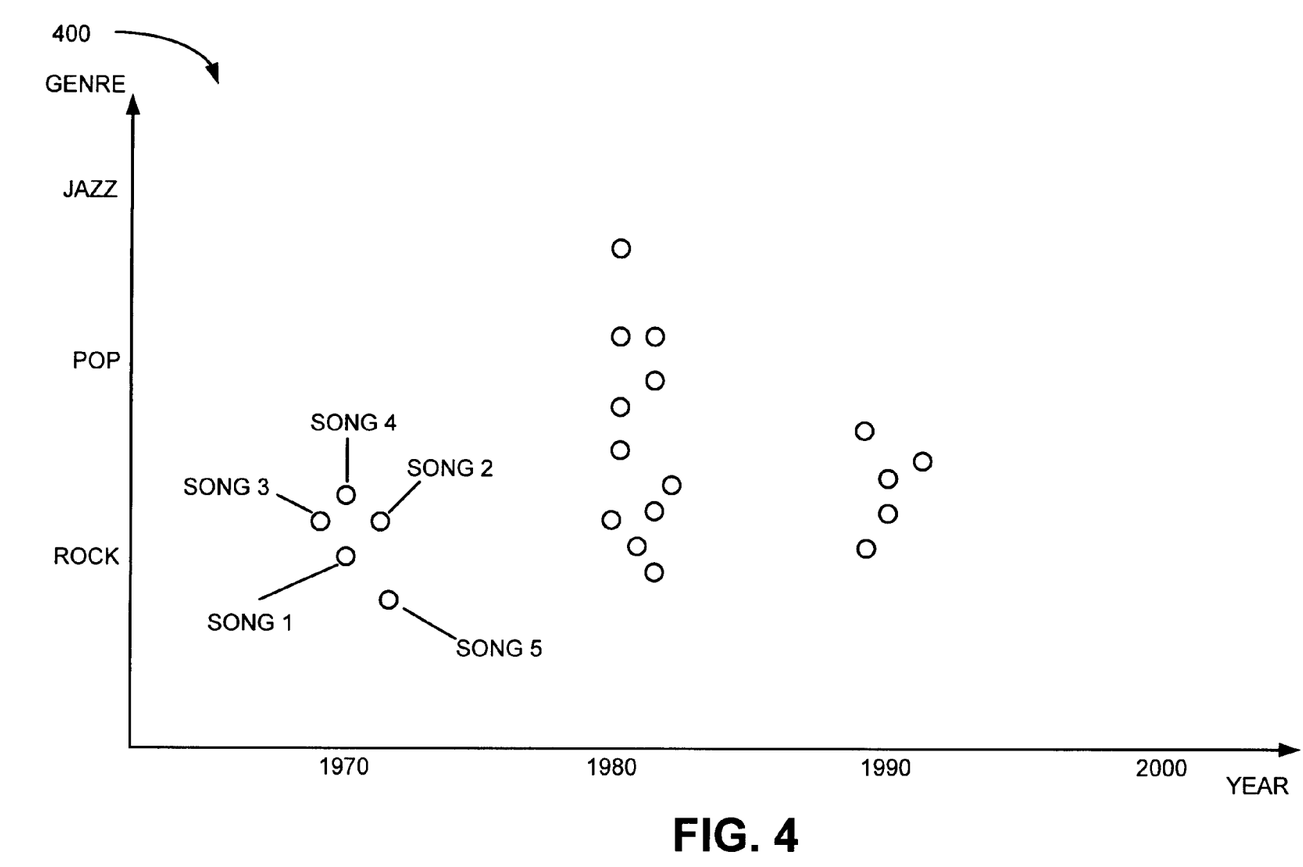
FIG. 4 is an exemplary graph displayed by the system of FIG. 1 consistent with the invention.

In other implementations, the information illustrated in graph 400 may be any grouping of songs, such as a group of songs set by the user or a group of songs that is automatically determined. For example, the group of songs illustrated in graph 400 may be songs most frequently played by a user, songs most recently stored in system 100 or some other grouping of songs.

At various times, the user of system 100 may wish to view his/her playlist (e.g., the songs that the user has played over a predetermined period, a predetermined number of most recently played songs, etc.). In this case, the user of system 100 may initiate viewing of the playlist via, for example, input device 160. This may include pressing a control button or keypad input on system 100 to receive a menu of options. System 100 may then display a menu via, for example, output device 170. Output device 170, as described above, may include a display screen. In this case, assume that one of the options in the menu is "graphical playlist" or a similarly named option. Further assume that the user selects the graphical playlist option from the menu.

System 100 may then provide the graphical playlist illustrated in FIG. 4 to the user via, for example, output device 170, such as a display screen (act 250). The user may then view the graphical presentation of the playlist. Viewing a playlist in a graphical form may allow the user to identify various trends associated with his/her listening habits. For example, in graph 400, the user may identify that he/she has listened to a number of songs recorded in the early 1970's that were of the rock genre. The user may also determine that he/she has listened to a number of songs recorded around 1980 in a number of different genres. This may give the user insight into his/her listening habits that may not be obtained from merely displaying a listing of songs that he/she has played. The user may also wish to receive a listing of the song titles for a number of the songs that he/she has played. Graph 400 may allow the user to select particular ones of the songs in which the title and/or additional information may be displayed, as described in detail below.

Figure 5:
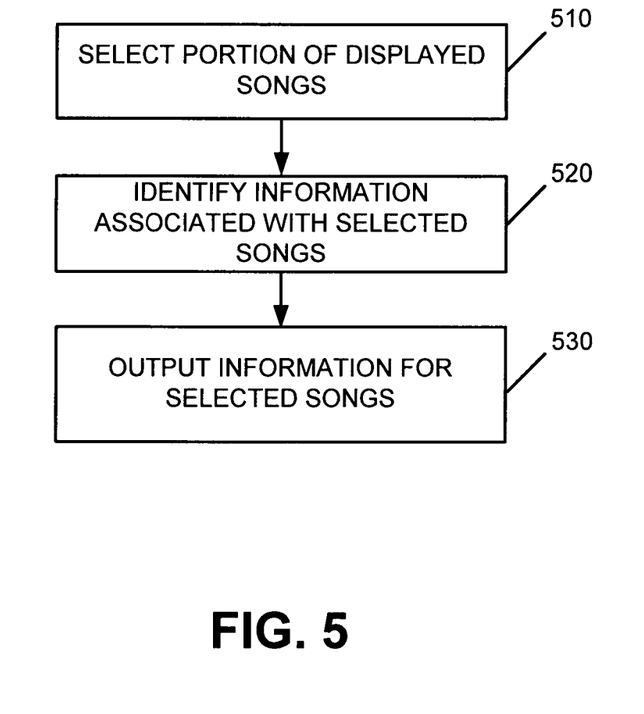
FIG. 5 is a flow diagram illustrating exemplary processing associated with displaying information to a user consistent with the invention.

FIG. 5 illustrates exemplary processing consistent with the invention associated with selecting particular songs provided in graph 400. In one implementation consistent with the invention, the user may view graph 400 and select particular ones of the songs identified in graph 400 (act 510). For example, in one implementation, the user may use input device 160 (e.g., a pen, a cursor, a keyboard, control/navigation keys or another input device) to select a particular song and expand an area around the selected song to generate an area/enclosure that includes a number of songs. For example, referring to FIG. 6, the user may use a mouse to select the song labeled as song 5 and drag the cursor to enclose a number of the displayed songs, as illustrated by enclosed area 610 in FIG. 6. In this case, songs 1, 2 and 5 are within enclosed area 610.

Figure 6:
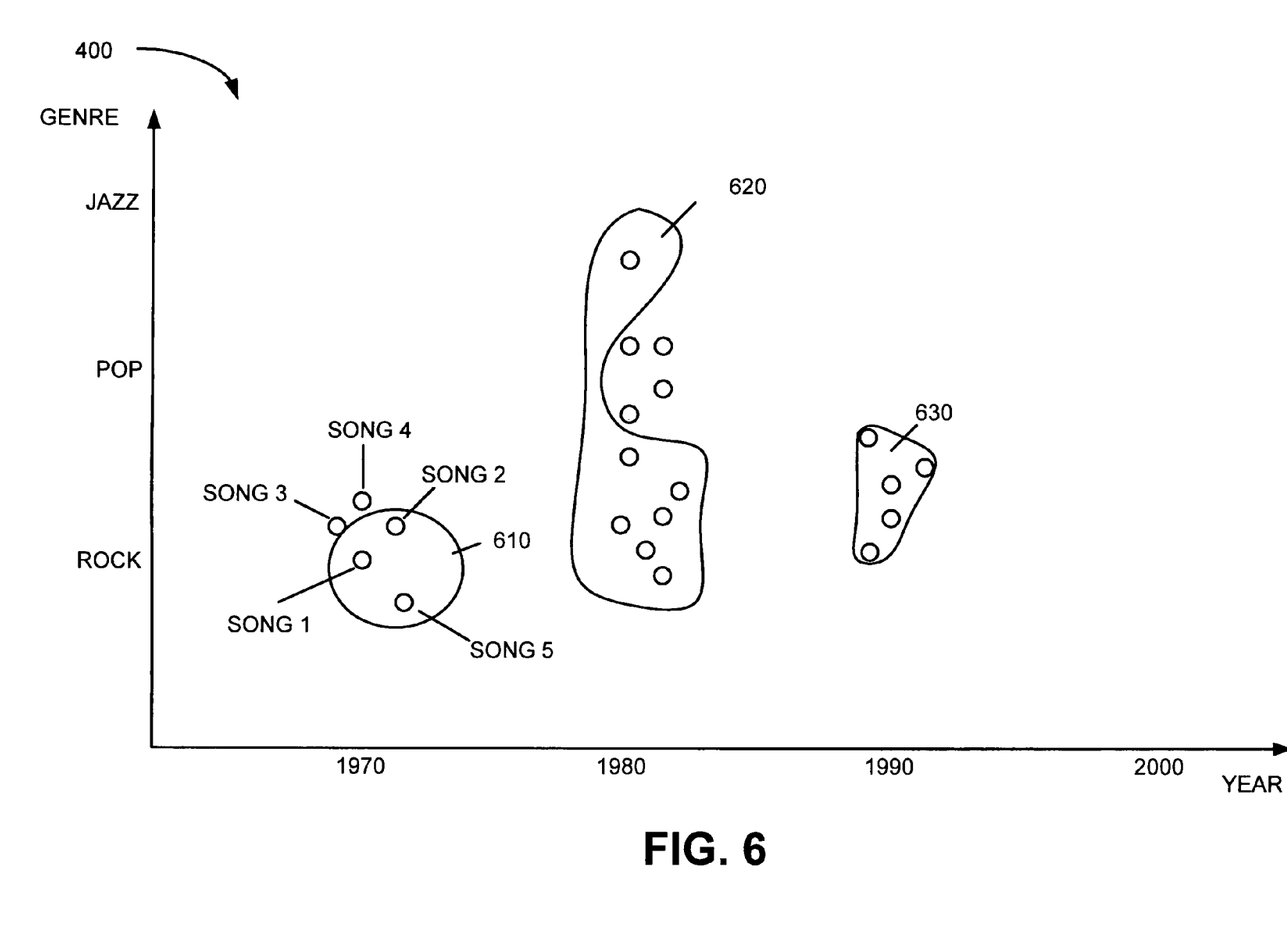
FIG. 6 is an exemplary graph displayed by the system of FIG. 1 consistent with the invention.

In an alternative implementation, the user may use input device 160 to enclose particular songs of interest in an area having an irregular shape, such as enclosed area 620. In this manner, the user may be able to avoid certain songs in an area that is not of interest. In still another implementation, the use may use input device 160 to highlight the songs of interest by, for example, clicking on the songs of interest, using a cursor, mouse, pen, keyboard input, control button, etc. For example, the user may select a number of songs displayed in graph 400. Processor 120 may optionally display these selected songs within an enclosed area, such as area 630. Alternatively, processor 120 may display these selected songs via highlighted data points in graph 400.

In each case, processor 120 identifies the selected songs and identifies information stored in database 300 that is associated with the selected songs (act 520). For example, processor 120 may then output the titles of the selected songs to the user via output device 170. For example, assume that the user has selected the songs identified by area 610. In this case, processor 120 may access database 300 and retrieve the titles of songs 1, 2 and 5 (i.e., the songs included in area 610) in title field 310. Processor 120 may then output the titles of the selected songs via output device 170 (act 530). Processor 120 may also output additional information associated with the selected songs, such as the artist/band playing the song, duration of the song, etc. In this manner, the user may receive a playlist of only selected songs, as opposed to all the songs played over a predetermined period. In some implementations, the user may also be able to perform a "select all" input. In this case, processor 120 may identify the title of each song displayed on graph 400 and output the titles for display.

In addition, in some implementations, the user may select one or more data points in graph 400 to obtain additional information associated with the selected song(s). For example, assume that the user selects (e.g., clicks on) the data point labeled as song 4 in FIG. 6. In this implementation, processor 120 may retrieve all relevant data for song 4 stored in database 300. Processor 120 may also retrieve any other relevant information associated with song 4, such as any additional meta data stored with song 4. Processor 120 may then output all or a portion of the retrieved information associated with song 4 to output device 170 for display.

In some implementations, system 100 may transmit the graphical playlist illustrated, for example, in FIG. 4 to other devices. For example, in some implementations, system 100 may include an RF transceiver that is able to transmit data to other devices and received data from other devices. In this implementation, the user of system 100 may use the RF transceiver to transmit the visual playlist to another device, such as another device with which the user uses to listen to music, a friend's device, etc. System 100 may also use the RF transceiver to receive graphical playlists from other devices, as described in more detail below. In this manner, users can share visual playlists.

In still other implementations, the user of system 100 may use the selected portion of the graphical playlist to identify other songs that may be of interest to the user. For example, suppose that the user (at act 510) selects the songs identified in area 610. System 100 may identify other songs stored in system 100 that are of a similar year and genre (e.g., rock songs from the early 1970's). System 100 may provide these songs to the user via, for example, output device 170. Alternatively, system 100 may automatically play these songs that are of a similar year/genre when system 100 is operating in a "random play" mode. For example, in a random play mode, system 100 may randomly play songs stored in system 100. In accordance with this implementation, the "random play" mode may restrict the songs played to songs that are similar year/genre to the songs selected by the user. In the above example, the random play mode would be restricted to rock songs from the early 1970s.

In another implementation, the graph displayed to the user, such as graph 400, may include a link to an online music store (not shown). In this implementation, the user may download music from the online music store based on information displayed in graph 400. For example, suppose that a user has circled an area on graph 400 that corresponds to 1980's pop music. In this case, an application executed by system 100 may contact the online music store, which may provide a list of other pop songs from the 1980s that are available for purchase. The list may be received by system 100 and displayed on output device 170. The user may then decide to purchase one or more of the displayed songs from the online music store.

The implementations described above refer to displaying two pieces of information on a graph, such as year/genre. In other implementations, the axes of the graph may be associated with other pieces of information, such as the artist performing the song in alphabetized order, a rating of the song, such as a personal or public rating of the song, a play count associated with how many times the song was played by the user, a download count providing information representing how many times the song was downloaded by various users, such as how many times an online music store downloaded the song, a mood associated with the song, a tempo associated with the song, such as a beats per minute value, a file size or time duration of the song, a purchase price of the song, or other information associated with song. This information may be gathered using meta data associated with the songs and/or automatically determined using application programs stored on system 100.

Implementations described above also refer to displaying a two-dimensional graph, such as graph 400. In other implementations, the information displayed to a user may be more than two-dimensional, such as three-dimensional, four-dimensional, etc. For example, in one implementation, a time variable (e.g., when system 100 played the song) may be displayed in graph 400, such as on another axis. In another implementation, a public rating associated with the displayed songs may be provided with two or more other pieces of information for each song. In such an implementation, the public rating may be displayed using various colors. For example, songs that are highly rated may be displayed in green, while songs that are lowly rated may be displayed in red. The public rating may also be updated in real time or near real time via, for example, the Internet, based on users' voting for different songs. Alternatively, the public rating may be a popularity measure based on, for example, sales of the song/album as provided by a music website, online music store, etc. In this manner, three or more pieces of information may be displayed for each song.

In still another implementation, system 100 may highlight all songs from a particular artist. For example, the songs from a first artist may be displayed in a first color and songs played from other artists may be displayed in different colors. In this manner, graph 400 may visually group songs by artist to let the user easily determine whether he/she is playing a number of songs by the same artist. System 100, consistent with another implementation, may also illustrate movement with respect to songs played by system 100 by connecting the dots in graph 400 as the songs are played. This movement may be based on, for example, an order in which the songs were played, an order based on the artist or another type of ordering. Alternatively, the movement may be randomized with respect to the songs played by system 100. This may allow the user to visually inspect how his/her selections of songs changes during a predetermined period of time.

In still other implementations, two or more different graphs can be superimposed on each other. For example, system 100 may display a first graph of songs, such as graph 400, played during a particular period of time, such as one day, in a first color. System 100 may then superimpose a second graph over the first graph and display the second graph in a different color. The second graph may represent songs played during an earlier period of time, such as the previous day. The particular periods of time associated with the superimposed graphs may be any particular period, such as graphs of music played over a single day, a week, a month, a year, etc. In this manner, the user may be able to visually compare the type of music he/she played during different time periods. In other implementations, the user may be able to compare songs he/she has played with the songs played by another party. For example, as described above, in some implementations, system 100 may transmit the visual playlist to another device and/or receive visual playlists from other devices. In this case, system 100 may display two or more visual playlists by superimposing the playlists on each other and displaying them in different colors. In this manner, a user may compare his/her musical tastes to the musical tastes of others by graphically comparing his/her playlist to playlists of others or may compare the musical tastes of others by comparing their respective playlists.

In addition, in the implementations described above with respect to FIGS. 4 and 6, each data point or dot on graph 400 corresponds to a song. In other implementations, each data point on the graph may represent other types of information or media. For example, in one implementation, each data point on the graph may represent an artist and the axes of the graph may represent genre, rating or other information associated with the artist. In another implementation, each data point on the graph may represent an album and the axes of the graph may represent the year, rating or other information associated with the album. In still other implementations, each data point on the graph may represent videos or images and the axes of the graphs may represent meta data or other information associated with the videos/images. In the cases of images, a playlist associated with a number of the selected data points may correspond to a slideshow of images/pictures. In general, a data point on the graph may represent any type of media/information and the axes of the graph may represent information associated with the particular media.

Implementations consistent with the invention generate and display graphs to a user via output device 170 and may also distribute graphs to other devices. Each graph may be stored as an image file (e.g., a bitmap), a vector format file (e.g., an animated scalable vector graphics (SVG) file with links), in a rule based format (e.g., a smart playlist such as that used by an online music vendor) or in another format. In each case, the graphs may be stored for later use and/or distribution.

Aspects of the invention described above provide a number of options with respect to displaying graphical playlists. In implementations consistent with the invention, system 100 may allow the user to customize the particular options based on his/her preferences. For example, input device 160 may provide a menu of options to the user. The menu may allow the user to select what information will be displayed on the graphical playlist, such as whether the list displays year/genre, genre/rating, year/rating, etc. The menu may also allow the user to select time periods associated with a graphical playlist, such as whether the user would like to view one or more of a daily playlist, weekly playlist, continuous playlist etc. The menu may also allow the user to select colors associated with information displayed via output device 170 or other information associated with a graphical playlist. In this manner, system 100 provides the user with a customizable graphical playlist that provides the desired information in the desired format.

CONCLUSION

Implementations consistent with the invention allow users to view information in a graphical manner. Advantageously, this may allow the user to identify connections between files that the user has played that otherwise may not be apparent. This may also help a user discover, for example, new music that he/she likes and also to share playlists with friends. In addition, aspects consistent with the invention enable a user to select particular media files (e.g., songs) in a very efficient, user-friendly manner. This may help increase a user's satisfaction level with respect to use of his/her media player.

The foregoing description of the embodiments of the invention provides illustration and description, but is not intended to be exhaustive or to limit the invention to the precise form disclosed. Modifications and variations are possible in light of the above teachings or may be acquired from practice of the invention.

For example, the invention has been mainly described in the context of a system playing music files. The invention, however, may be used to display information associated with other types of media, such as video files (e.g., television shows, movies, etc.). The invention may also be used to display other types of media content, such as playlists associated with songs that were played by radio stations accessed via system 100, games (e.g., video games) played by the user of system 100, images viewed by the user of system 100, etc. In general, system 100 may provide a graphical "playlist" of any type of media content played by system 100.

In addition, the graph provided to a user may represent content retrieved locally from system 100. In addition, in some implementations, the content may represent content accessed from an external device, such as a server accessible to system 100 via, for example, a network. In the case of content being stored on a server, a list of available media files may be provided to the user with corresponding links. When a link is selected, the selected media file may be automatically played in a streaming playback option or system 100 may provide a download option allowing the user to select whether to download the selected file from the server to system 100.

Further, while series of acts have been described with respect to FIGS. 2 and 5, the order of the acts may be varied in other implementations consistent with the invention. Moreover, non-dependent acts may be performed in parallel.

It will also be apparent to one of ordinary skill in the art that aspects of the invention, as described above, may be implemented in any device/system capable of playing various media (e.g., music and/or video files). For example, aspects of the invention may be implemented in a mobile terminal/telephone, such as a cellular telephone, a personal digital assistant (PDA), a computer or any other device with media-playing capability. Aspects of the invention may also be implemented in methods and/or computer program products. Accordingly, the invention may be embodied in hardware and/or in software (including firmware, resident software, micro-code, etc.). Furthermore, the invention may take the form of a computer program product on a computer-usable or computer-readable storage medium having computer-usable or computer-readable program code embodied in the medium for use by or in connection with an instruction execution system. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit or a field programmable gate array, software, or a combination of hardware and software.

It should be emphasized that the term "comprises/comprising" when used in this specification is taken to specify the presence of stated features, integers, steps, or components, but does not preclude the presence or addition of one or more other features, integers, steps, components, or groups thereof.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on," as used herein is intended to mean "based, at least in part, on" unless explicitly stated otherwise.

The scope of the invention is defined by the claims and their equivalents.

What is claimed is:

1. A method performed by a device, comprising:
receiving, at a processor of the device, selection of a plurality of songs from a user;
generating, by the processor, a graph illustrating at least two pieces of information associated with each of the plurality of songs, a first axis of the graph being associated with a first piece of information associated with the songs and a second axis of the graph being associated with a second piece of information associated with the songs, and each song of the plurality of songs being represented by a point on the graph;
displaying, on a display associated with the device, the generated graph to the user;
detecting, by the processor, selection of a portion of the plurality of points in the graph, the selected portion including more than one point of the plurality of points; and
displaying, on the display associated with the device and for each point in the selected portion, a title of the song that the point represents.

2. The method of claim 1, where the first piece of information comprises a year in which a song was recorded and the second piece of information comprises a genre of music associated with a song.

3. The method of claim 1, where the detecting selection of a portion of the plurality of points includes:
receiving a graphical input from the user enclosing the points in the selected portion.

4. The method of claim 1, where the detecting selection of a portion of the plurality of points includes:
detecting highlighting of the points in the selected portion.

5. The method of claim 1, further comprising:
identifying, for each of the plurality of songs, at least two of a year in which the song was recorded, a genre associated with the song, an artist associated with the song, or a rating associated with the song; and
storing the identified information for each of the plurality of songs.

6. The method of claim 5, where the generating includes:
generating the graph based on the identified information.

7. The method of claim 1, further comprising:
displaying abbreviated titles for each of the plurality of songs in the graph.

8. The method of claim 1, further comprising:
automatically identifying an additional song based on the selected portion; and
at least one of displaying a title of the additional song or playing the additional song.

9. The method of claim 1, where the graph represents the plurality of songs, and
where the method further comprises:
superimposing a second graph over the graph, the second graph representing a different plurality of songs.

10. A device, comprising:
a memory to store information relating to a plurality of songs; and
a processor to:
generate a graph illustrating information associated with each of the plurality of songs, a first axis of the graph being associated with a first item of information and a second axis of the graph being associated with a second item of information and each song of the plurality of songs being represented by a point on the graph,
cause the generated graph to be output to a user,
receive selection of a portion of the plurality of points from the graph, the selected portion including more than one point of the plurality of points,
identify titles of songs corresponding to the points in the selected portion, and
cause the identified titles to be output to the user.

11. The device of claim 10, where the first and second items of information each comprises at least one of a year, a genre of music, an artist, or a rating.

12. The device of claim 10, where, when receiving selection of a portion of the plurality of points from the graph, the processor is configured to:
receive a graphical input from the user enclosing the points in the selected portion.

13. The device of claim 10, where, when receiving selection of a portion of the plurality of points from the graph, the processor is configured to:
detect highlighting of the points in the selected portion.

14. The device of claim 10, further comprising:
a receiver to receive a second graph from a second device.

15. The device of claim 14, where the processor is further configured to:
receive the second graph from the receiver, and
superimpose the second graph on the graph.

16. The device of claim 10,
where the processor is further configured to:
identify at least one additional song based on the selected portion.

17. The device of claim 16, where the processor is further configured to:
play the at least one additional song.

18. The device of claim 10, where the processor is further configured to:
provide a link to a music vendor to the user.

19. A computer-readable memory device having stored thereon a plurality of instructions which, when executed by at least one processor, cause the processor to:
receive selection of a plurality of songs;
generate a graph illustrating information associated with each of the plurality of songs, a first axis of the graph being associated with a first item of information and a second axis of the graph being associated with a second item of information, each song in the plurality of songs being represented by a point on the graph;
output the graph to a user;
receive selection of a portion of the plurality of points in graph, the selected portion including more than one point of the plurality of points; and
provide, in response to receiving the selection, titles of songs corresponding to the points in the selected portion.

20. The computer-readable memory device of claim 19, where the first and second items of information each comprises at least one of a year in which a song was recorded, a genre of music, an artist or a rating.

21. The computer-readable memory device of claim 19, where, when receiving selection of the portion, the instructions cause the processor to:
receive a graphical input from a user that at least one of encloses the selected portion of points or highlights the selected portion of points.

22. A device, comprising:
means for storing a plurality of files;

means for generating a graph illustrating information associated with each of the plurality of files, a first axis of the graph being associated with a first item of information and a second axis of the graph being associated with a second item of information, each file of the plurality of files being represented by a point on the graph;

means for outputting the graph to a user;

means for receiving selection of a plurality of the points on the graph, the selected portion of points including more than one point; and means for displaying titles of files corresponding to the points in the selected portion.

23. The device of claim 22, where the plurality of files comprise at least one of music files, video files, or video games.

24. A method comprising:

generating, at a first device, a first multi-dimensional graph that includes a first plurality of data points, the first plurality of data points representing a first plurality of media files associated with the first device;

receiving, from a second, different device, a second multi-dimensional graph that includes a second plurality of data points, the second plurality of data points representing a second plurality of media files associated with the second, different device;

superimposing the second multi-dimensional graph on the first multi-dimensional graph to form a graph that includes the first multi-dimensional graph and the second multi-dimensional graph; and providing the graph that includes the first multi-dimensional graph and the second multi-dimensional graph to a user associated with the first device.

25. The method of claim 24, where the first multi-dimensional graph comprises at least one of a three-dimensional graph or a four-dimensional graph.

* * * * *